United States Patent [19]

Koblischek et al.

[11] Patent Number: 4,826,127
[45] Date of Patent: May 2, 1989

[54] MACHINE SUPPORTS MADE FROM ACRYLIC CONCRETE

[75] Inventors: Peter Koblischek, Parkstrasse 15, D-6000 Frankfurt am Main 1; Rudolf Nicklau, Seeheim-Jugenheim, both of Fed. Rep. of Germany

[73] Assignee: Peter Koblischek, Fed. Rep. of Germany

[21] Appl. No.: 36,721

[22] Filed: Apr. 10, 1987

Related U.S. Application Data

[62] Division of Ser. No. 292,085, Aug. 11, 1981, Pat. No. 4,670,208.

[30] Foreign Application Priority Data

Aug. 16, 1980 [DE] Fed. Rep. of Germany ....... 3030914

[51] Int. Cl.$^4$ .......................... B23Q 1/02; B28B 23/00
[52] U.S. Cl. ..................................... 248/679; 264/250; 264/259; 264/271.1; 264/331.18; 524/650; 524/779
[58] Field of Search .................... 264/250, 256, 331.18, 264/259, 271.1; 524/650; 248/1, 637, 676, 679

[56] References Cited

U.S. PATENT DOCUMENTS 4,670,208  6/1987  Koblischek et al. ................ 264/250

FOREIGN PATENT DOCUMENTS 2058274  6/1971  Fed. Rep. of Germany ........ 106/90
2756820  6/1978  Fed. Rep. of Germany ...... 264/256
53-39444 10/1978  Japan .................................. 524/650
1556941 12/1979  United Kingdom ................ 264/256

Primary Examiner—Philip Anderson
Attorney, Agent, or Firm—James Creighton Wray

[57] ABSTRACT

High-quality machine parts, e.g. machine supports, are manufactured of concrete polymer on the basis of methacrylate monomer polymerizing at room temperature and of aggregates. The monomer used has a dynamic viscosity of less than 10 mPas (10 cP) preferably of 1–10 mPas (1–10 cP). The admixed starter system comprises an organic peroxide and an aromatic tertiary amine, the latter being dissolved in methacrylate monomer.

10 Claims, 4 Drawing Sheets

MACHINE SUPPORTS MADE FROM ACRYLIC CONCRETE

This application is a division of application Ser. No. 292,085, filed 8-11-81, now U.S. Pat. No. 4,670,208.

BACKGROUND OF THE INVENTION

1. FIELD OF THE INVENTION

This invention relates in general to the construction of machine parts and in particular to a new and useful method of manufacturing machine supports by means of concrete polymer.

2. BRIEF DESCRIPTION OF THE PRIOR ART

It is known by the published German application DE-OS No. 27 43 396 to manufacture machine supports for machine tools for a mechanical mixture of sand, gravel or broken stones and a multiple-component synthetic material, e.g. epoxide resin or polyester resin.

Several difficulties arose in this process of manufacture and has up to now impeded a general introduction of this process for manufacturing machine supports and the like.

The published German application DE-AS No. 12 53 629 describes a process for manufacturing and repairing platforms of roadways, of airports runways and taxiways, using essentially granular stones such as chips, gravel, sand; in this process the aforesaid materials are mixed with methylmethacrylate, this mixture is laid onto the road foundation or onto the place to be repaired and is hardened by polymerization of the monomer under the influence of an accelerator or an accelerator system acting at normal temperature.

In this known process a polymerisate dispersible in methylmethacrylate, in particular polymethylmethacrylate, is admixed to the stone material, and this mixture is worked before the monomers disperse homogeneously or dissolve in the polymerisate particles.

This known process, however, is not applicable to the manufacture of machine supports and similar products as the mechanical properties which may be satisfactory for the intended use, are by no means sufficient to support stresses arising in machine support and similar structural parts.

SUMMARY OF THE INVENTION

Machine parts, e.g. machine supports, are manufactured by means of polymer concrete using methacrylate monomer polymerizing at room temperature with a dynamic viscosity of less than 10 mPas (10 cP) and admixing to the monomer and/or to the aggregate particles a starter system which contains peroxide and forms radicals. Plate-shaped structural parts of steel or of synthetic material, e.g. guiding ways, can be inserted into the surface of the machine part consisting of concrete polymer.

It is advantageous to admix a pulverized organic peroxide to a polymeric methylmethacrylate powder and to use as a starter system an organic peroxide and an aromatic tertiary amine.

The machine part can also consist of an iron construction which is filled up with methacrylic concrete.

These machine parts resist to aggressive media such as cutting oils and have, compared to machine supports of gray cast iron or cast steel or welded steel constructions, an essentially higher, at least six times greater, damping power so that when doing lathe work for instance, no chatter marks occur even at an essentially increased cutting speed.

These machine supports proved to have a high flexural strength and simultaneously a high damping power.

DESCRIPTION OF THE INVENTION AND PREFERRED EMBODIMENTS

Figure 1:
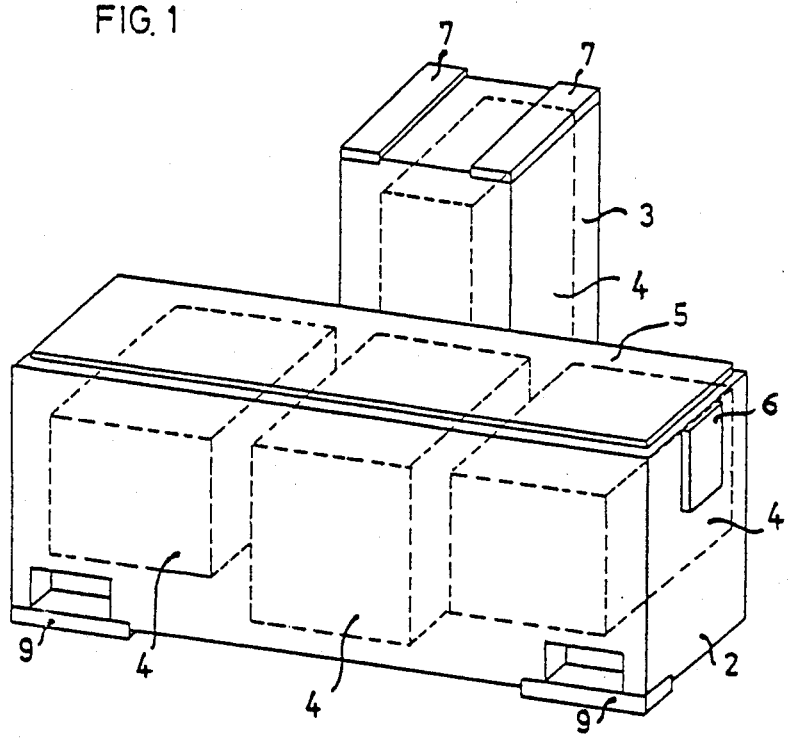
FIG. 1 is an isometric representation of a machine support for a high-efficiency milling machine.

FIG. 1 shows a machine support for a milling machine of high milling efficiency. The machine support shown in the figure comprises a longitudinal part 2 of essentially parallelepiped-shape and a tower part 3 of essentially parallelepiped-shape, the two being made in one piece of the same material and consisting essentially of acrylic concrete. The longitudinal part 2 as well as the tower part 3 comprises parallelepiped-shaped intercalations 4 of polyurethane foam which, during the manufacturing process, are poured in as a lost core to save material and to essentially reduce the weight of the manufactured product.

Stiffening steel plates 5, 6, and 7 are cast into the parallelepiped-shaped longitudinal part 2 and into the tower part 3.

These steel plates serve for mounting further structural parts. The automatic advance of the milling machine is mounted onto the steel plate 5 and is rigidly fastened thereto by means of screws. The main drive of the automatic advance is flanged to the steel plates 6, and the milling spindle unity is mounted onto both parallel plates 7. Furthermore the machine support comprises cast-in feet 9; above these feet are provided recesses 10 which can facilitate the transportation and which are provided to receive adjusting screws by means of which the machine can be adjusted horizontally at its working place.

To manufacture the machine support as shown in partially schematically simplified manner in FIG. 1, either the parallelpiped-shaped longitudinal part 2 and the tower part 3 are cast together in one mould, or the parallelepiped-shaped longitudinal part 2 is cast in a mould and then, after its hardening, the parallelepiped-shaped tower part 3 is cast thereto in an additional mould and thus rigidly bonded to part 2.

The steel plates 5, 6, and 7 are inserted into the mould at the corresponding places; in some cases it may be useful to fix the steel plate 6 and also the feet 9 to the walls of the mould from outside by means of screws.

The mixture of aggregates and methacrylate monomer and starting system is poured into the appropriately prepared mould. It is advantageous to first mix the dry organic peroxide and the polymethacrylate powder to form a starting system and then to admix to this dry mixture a methacrylate monomer of low viscosity. First only a part of this mixture is poured into the mould, then the parallelpiped-shaped intercalations 4 of polyurethane foam are inserted and then the mould is filled up to the provided height. It may be useful to provide the machine support with a gel coat. While pouring into the mould the acrylic cement is densified by vibration and eventually by an additional evacuation.

Figure 2:
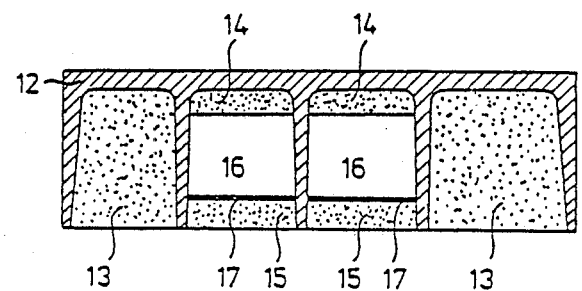
FIG. 2 is a vertical sectional view through a machine support of a grinding machine.

The machine support of a grinding machine as shown in FIG. 2 in a vertical cross-section view, comprises a formed part 12 of cast steel thus forming its surface. The cavities between the individual ribs of this formed part are filled up with a layer 13 of acrylic concrete; the cavities between the middle ribs are filled up in the upper part with layers 14 and in the lower part with layers 15 of acrylic concrete. The cavities 16 are either sealed by sheets parts 17 to avoided any penetration of acrylic concrete when manufacturing the layers 15, or they are filled with inserted blocs of foam material, e.g. foamed polyurethane resin. In some cases it may be advantageous to use welded steel constructions instead of a formed part of cast iron.

Compared to the hitherto known machine supports manufactured only as a steel construction in conventional manner, the machine support shown in FIG. 2 in a cross-section representation offers among others the great advantage of a higher damping power and an increased stiffness.

Figure 3:
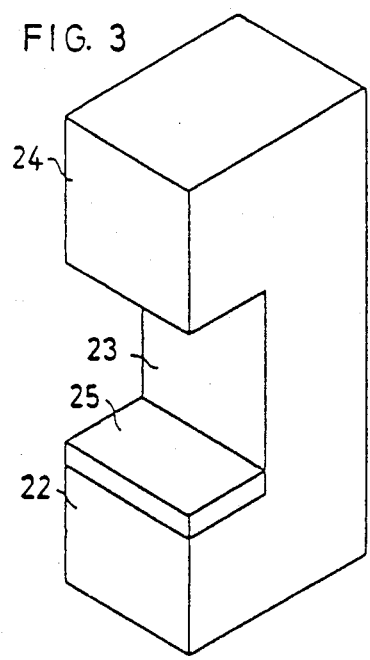
FIG. 3 shows a machine support according to the invention comprising a lower part of the support, a column and an upper part of the support.

FIG. 3 shows a machine support according to the invention wherein the upper part 24 projects laterally over the column 23 so that the lower part 22 of the support, the column 23 and the upper part 24 of the support form a vertical C. A working plate 25 of steel (shown in a very simplified manner) is provided on the lower part 22 of the support on which are mounted further parts necessary for the operation of the machine (not shown in the Figure).

Figure 4:
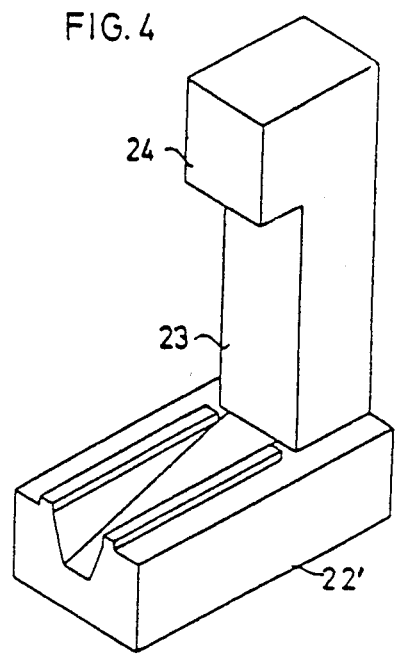
FIG. 4 shows a variation of the embodiment shown in FIG. 3.

FIG. 4 shows an embodiment similar to FIG. 3 wherein, however, the lower part 22' of the support consists of an iron construction filled up with methacrylate resin.

Figure 5:
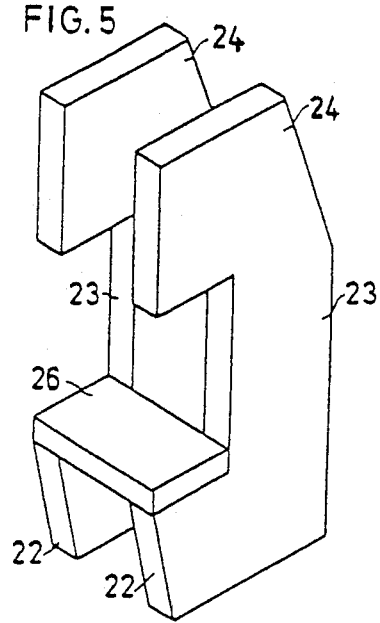
FIG. 5 shows another variation of the embodiment shown in FIG. 3.

FIG. 5 shows an embodiment wherein two C-shaped individual supports are combined by means of a working plate 26 to form a double-support, each support comprising a lower part 22 of the support, a column 23 and an upper part 24 of the support. The working plate 26 can either be made of acrylic concrete or be a steel construction which might be filled up with acrylic concrete.

Figure 6:
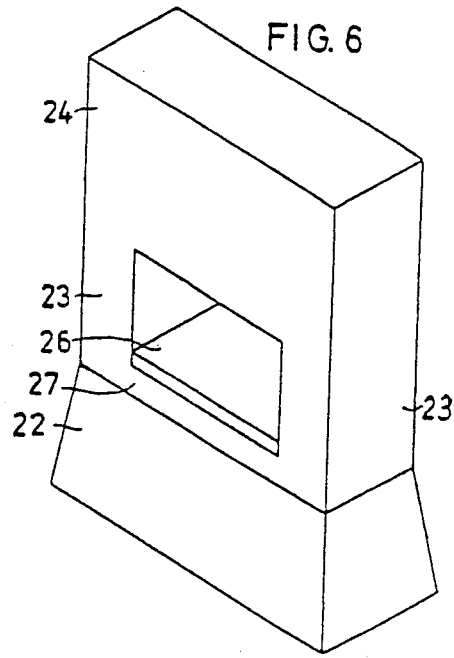
FIG. 6 shows an embodiment according to the invention where the upper part of the support and the lower part of the support are connected by two columns.

FIG. 6 shows an embodiment of a machine support with a symmetrical structure, a so-called portal form. In this embodiment the lower part 22 of the support and the upper part 24 of the support are combined by two columns 23. In this embodiment upper part 24 of the support, columns 23 and a strip 27 connecting them in their lower section are made in one piece of the same material. A working plate 26 is also provided. Referring to its shape the embodiment as shown in FIG. 6 corresponds to a combination of two C-shaped machine supports arranged mirror-inverted.

Figure 7:
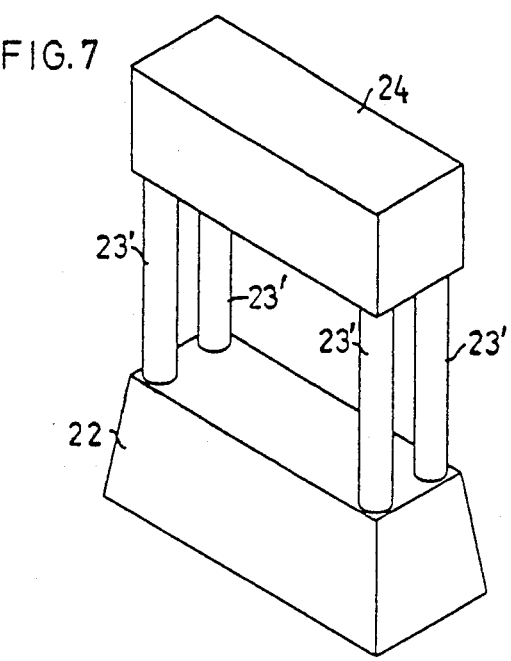
FIG. 7 shows a variation of the embodiment of FIG. 6 comprising four columns between upper part of the support and lower part of the support.

FIG. 7 shows an embodiment of a machine support in a portal form according to the invention wherein lower part 22 and upper part 24 of the machine support are connected by means of four columns 23' of acrylic concrete.

Figure 8:
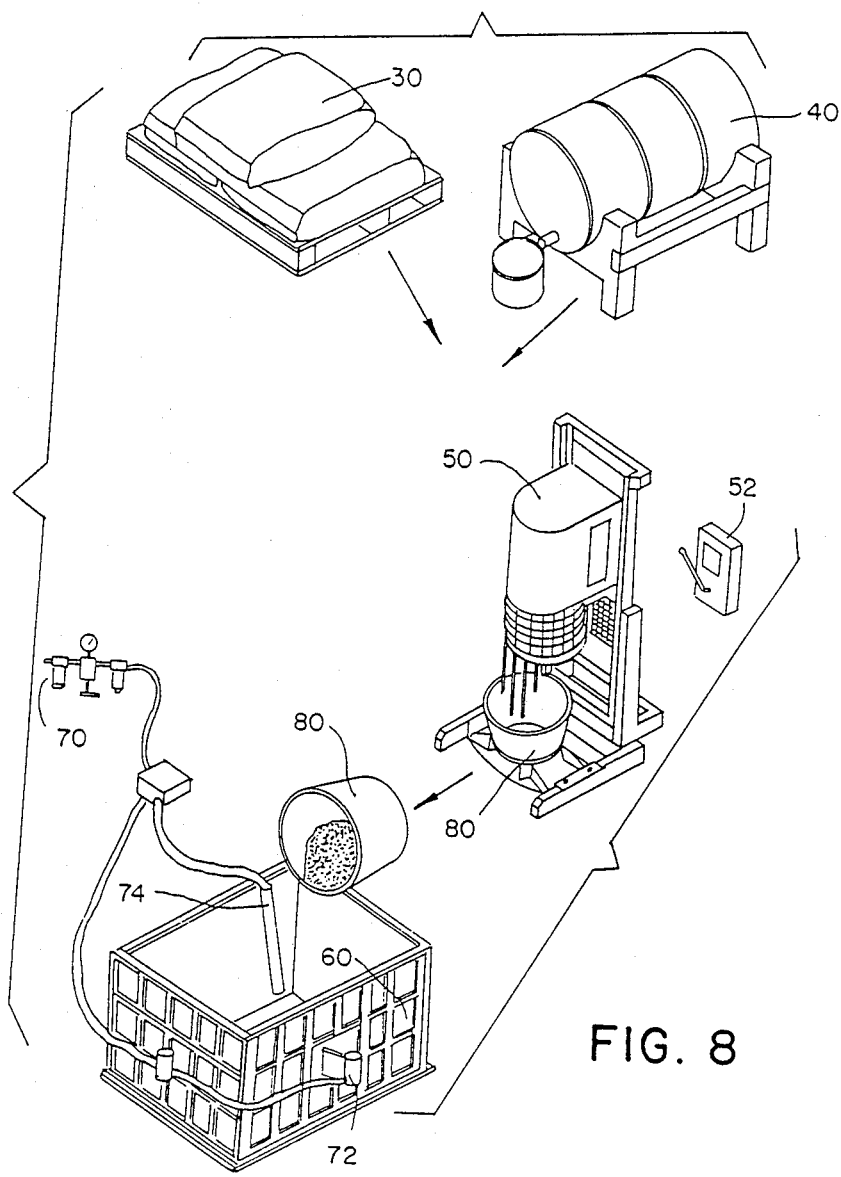

FIG. 8 is a scheme illustrating the process according to the invention. The scheme shows packing units 30 containing a filler component essentially consisting of the aggregates and a dry organic peroxide thoroughly admixed therewith. A barrel 40 contains a liquid binding component essentially consisting of a polymerizable methacrylate reaction monomer having a dynamic viscosity of less than 10 mPas (10 cP) and of an aromatic tertiary amine thoroughly dissolved therein. A predetermined amount of the dry filler component and a predetermined amount of the liquid binding component are introduced into a mixing container 80. The components contained in the mixing container 80 are positively mixed by a mixer 50, such as a paddle mixer. The electric power supply for the motor of the mixer 50 is shown at 52. Immediately upon completion of the mixing process, the resulting mixture is put into a form 60 having a shape corresponding to that of the high-quality machine part to be manufactured. Vibrators 72 at the outside of the form 60 and/or immersion vibrators 74 are provided to densify the mixture in the form 60. The vibrators 72, 74 are driven by a compressed air supply 70. After compacting with the vibrators, the hardening process is finished in about 1 hour, and the produced machine part can be demolded and is ready for use.

The process for manufacturing machine supports according to the invention is characterized by the following advantages:

1. The speed of the curing process can be varied within relatively wide limits by an appropriate proportioning of the starter system. In particular it has been found that already after one hour the curing can be achieved to such an extent that the machine support can be demoulded. Consequently a mass production can be performed with only one mould. This is of a great economic important with regard to the extreme high costs of the moulds for machine supports of complicated shape.

2. Machine supports of acrylic concrete offer the great advantage to make it possible to fabricate certain structural parts as basic types and to produce them for stock. Thus a great flexibility is obtained as the basic type can later be easily adapted or completed to meet all requirements of the special task or of the intended use by an additional manufacturing and attachment of further structural parts.

3. Compared to machine supports of cement concrete, the machine support according to the invention offers the advantage that is absorbs practically no humidity and thus resists to aggressive media, e.g. cutting oil emulsions.

4. Compared to machine supports of gray cast iron or cast steel or welded steel constructions, the machine support according to the invention has an essentially higher damping power, which is at least six times higher, so that when doing lathe work even at substantially increased cutting speed no chatter marks appear.

5. Machine supports comprising a methacrylate monomer polymerizing at room temperature and having a dynamic viscosity of less than 10 mPas (10 cP), preferably of less than 2 mPas (2 cP), give a high flexural strength and at the same time a high damping power. This is especially important for the columns as these are stressed by tensile forces, and in the case of C-shaped supports the columns are stressed by bending strengths.

While specific embodiments of the invention have been shown and described in detail to illustrate the application of the principles of the invention it will be understood that the invention may be embodied otherwise without departing from such principles.

What is claimed is:

1. A machine support comprising a lower part of the support, an upper part of the support and at least one vertical column combining them together, wherein the machine support is made of acrylic concrete consisting essentially of aggregates and methacrylate resin.

2. Machine support according to claim 1 characterized in that the upper part (24) of the support projects laterally over the column (23) so that the lower part (22) of the support, the column (23) and the upper part (24) of the support have essentially the shape of an upright standing C (FIG. 3).

3. Machine support according to claim 1 characterized in that the upper part (24) of the support is based on at least two parallel columns (23) with a space between them (FIG. 5).

4. Machine support according to claim 1 characterized in that the upper part (24) of the support is based on at least four parallel columns (23') with a space between them (FIG. 7).

5. Machine support according to claim 1 characterized in that the upper part (24) of the support and/or the lower part (22) of the support consist of acrylic concrete, and that the parts of the column (23) and the upper part (24) of the support consisting of acrylic concrete, preferably also the lower part (22) of the support, are made in one piece.

6. Machine support according to claim 1 characterized in that the lower part (22) of the support and/or the column (23, 23') and/or the upper part (24) of the support consist of an iron construction filled up with methacrylic concrete.

7. A machine support comprising,
means for supporting a machine wherein the means is made of acrylic concrete, and
a plurality of load-bearing plates molded into outer surfaces of the supporting means,
wherein the acrylic concrete consists essentially of aggregates and methacrylate reins.

8. The device of claim 7 further comprising,
intercalation means, disposed within the supporting means, wherein the intercalation means comprises polyurethane foam.

9. A machine support comprising,
a metallic body having plural upstanding ribs, and
acrylic concrete filling the area between individual ribs, wherein the acrylic concrete consists essentially of aggregates and methacrylate resin.

10. The device of claim 9 wherein a medial portion of the support is provided with cavities filled with lightweight foam material.

* * * * *